US010280094B2

(12) United States Patent
Nishikawa et al.

(10) Patent No.: US 10,280,094 B2
(45) Date of Patent: May 7, 2019

(54) METHOD AND APPARATUS FOR TREATING UREA AQUEOUS SOLUTION

(71) Applicant: TOYO ENGINEERING CORPORATION, Tokyo (JP)

(72) Inventors: Genshi Nishikawa, Narashino (JP); Yuta Abe, Narashino (JP); Keiji Sano, Narashino (JP)

(73) Assignee: Toyo Engineering Corporation, Tokyo (JP)

( * ) Notice: Subject to any disclaimer, the term of this patent is extended or adjusted under 35 U.S.C. 154(b) by 6 days.

(21) Appl. No.: 15/592,113

(22) Filed: May 10, 2017

(65) Prior Publication Data
US 2017/0341951 A1    Nov. 30, 2017

(30) Foreign Application Priority Data

May 24, 2016 (JP) .................................. 2016-103473

(51) Int. Cl.
*B01D 3/00* (2006.01)
*C02F 1/02* (2006.01)
(Continued)

(52) U.S. Cl.
CPC .............. *C02F 1/025* (2013.01); *B01D 3/009* (2013.01); *B01D 19/001* (2013.01); *C02F 1/20* (2013.01);
(Continued)

(58) Field of Classification Search
None
See application file for complete search history.

(56) References Cited

U.S. PATENT DOCUMENTS

| 4,220,635 A * | 9/1980 | Schell ..................... C01C 1/086 423/358 |
| 4,456,535 A * | 6/1984 | Zuidam ................. C07C 273/04 210/750 |
| 5,399,755 A * | 3/1995 | Lagana' ................. B01J 19/006 210/750 |

FOREIGN PATENT DOCUMENTS

CN    103011366 A    4/2013
DE      212037 A1    8/1984
(Continued)

OTHER PUBLICATIONS

CN103011366 A Machine Translation—Li et al—Apr. 3, 2013 (Year: 2013).*
(Continued)

*Primary Examiner* — Krishnan S Menon
*Assistant Examiner* — Bradley R Spies
(74) *Attorney, Agent, or Firm* — Knobbe, Martens, Olson & Bear, LLP

(57) ABSTRACT

A method for treating a urea aqueous solution includes a first stripping step of steam stripping an aqueous solution containing urea, ammonia and carbon dioxide at 0.2 to 0.6 MPaA in a first stripper to separate ammonia and carbon dioxide from this aqueous solution into a gas phase; a hydrolysis step of hydrolyzing urea in the solution obtained from the first stripping step at an LHSV of 10 to 20 $h^{-1}$, at 1.1 to 3.1 MPaA and 180 to 230° C. in a catalytic hydrolyzer; and a second stripping step of steam stripping a liquid obtained in the hydrolysis step in a second stripper to separate ammonia and carbon dioxide from this liquid into a gas phase. The residual urea concentration can be reduced to 1 ppm or lower; the residual ammonia concentration can be decreased; LHSV can be increased; and an increase in apparatus size is minimized.

6 Claims, 3 Drawing Sheets

(51) Int. Cl.
*C02F 1/20* (2006.01)
*B01D 19/00* (2006.01)
*C02F 101/16* (2006.01)
*C02F 103/36* (2006.01)

(52) U.S. Cl.
CPC ...... *C02F 2101/16* (2013.01); *C02F 2103/36* (2013.01); *C02F 2209/02* (2013.01); *C02F 2209/03* (2013.01); *C02F 2209/40* (2013.01); *C02F 2301/08* (2013.01)

(56) References Cited

FOREIGN PATENT DOCUMENTS

| EP | 0053410 A1 | 6/1982 |
| EP | 0417829 A1 | 3/1991 |
| JP | S5352274 A | 5/1978 |
| JP | 06-091987 B | 11/1994 |

OTHER PUBLICATIONS

Search Report of Application No. GB1708108.4 dated Oct. 31, 2017 in 5 pages.

\* cited by examiner (a)

(b)

(c)

(a)

(b)

METHOD AND APPARATUS FOR TREATING UREA AQUEOUS SOLUTION

This application is based upon and claims the benefit of priority from Japanese patent application No. 2016-103473, filed on May 24, 2016, the disclosure of which is incorporated herein in its entirety by reference.

BACKGROUND OF THE INVENTION

1. Field of the Invention

The present invention relates to a method for treating an aqueous urea solution, and in particular to a method and an apparatus for treating an aqueous solution containing small amounts of urea, ammonia and carbon dioxide, such as process condensate which is condensed water separated and condensed from a concentration step in a urea production plant, in order to obtain water which has reduced concentrations of urea and ammonia.

2. Description of the Related Art

Process condensate is condensed water separated and condensed from the concentration step in a urea production plant. The process condensate is water (an aqueous solution) containing urea, ammonia and carbon dioxide. The process condensate may be discharged from urea production plants to the environment. In the past, the concentration of urea in wastewater was usually regulated to about 50 ppm (ppm is on a mass basis, the same applies hereinafter). However, the requirement nowadays is often that the process condensate be discharged after being treated so that the concentration of urea in wastewater is about 1 ppm. The common method for treating wastewater containing urea involves hydrolyzing urea by heating. It is sometimes desirable to reduce the concentration of ammonia in wastewater to a low concentration.

Process condensates may contain a small amount of biuret (urea dimer). In the present specification, "urea" can be interpreted to include biuret.

In order to reduce the residual urea in the process condensate to 1 ppm or lower by using a single hydrolyzer, it is necessary to increase the residence time and increase the apparatus size. It is known that, in the interior of the hydrolyzer, ammonia and carbon dioxide which are generated by hydrolysis are not immediately vaporized and remain in the liquid, and the residual ammonia hinders the hydrolysis of urea. JP H06-91987B discloses a technology which is capable of avoiding such a phenomenon and reducing the concentration of the residual urea to 5 ppm or lower.

CN103011366A proposes a method in which hydrolysis of urea and stripping are carried out by using activated alumina, zeolite, $SO_2$-4/$TiO_2$ or $SiO_2$—$Al_2O_3$ as a catalyst to reduce the concentrations of the remaining urea and ammonia to 5 ppm or lower.

SUMMARY OF THE INVENTION

Even according to the technology described in JP H06-91987B, in order to reduce the residual urea concentration to 1 ppm or lower, the liquid hourly space velocity LHSV in a hydrolyzer is estimated to be about 1 $h^{-1}$. Therefore, the size of the apparatus becomes large.

In the method described in CN103011366A, since the hydrolyzer is operated under the conditions of a relatively low-pressure and a low-temperature of 0.3 to 1.1 MPa and 130° C. to 180° C., the reaction rate of hydrolysis is not fast. Further, LHSV is described to be about 0.8 to 2.0 $h^{-1}$, and therefore the apparatus size will be large.

In addition, in CN103011366A, catalysts are used in both the hydrolyzer and a lower part of a condensate stripper, thus the hydrolysis of urea is carried out in these two apparatuses, and thereby the concentration of urea of 5 ppm in the discharged wastewater is achieved. According to this literature, ammonia and carbon dioxide are removed from a liquid at the top of the hydrolyzer, then the liquid is introduced to the lower part of the stripper, and thereby the efficiency of the urea decomposition in the lower part of the stripper is enhanced. By performing steaming in the lower part of the condensate stripper, stripping is carried out simultaneously with hydrolysis to separate and remove ammonia and carbon dioxide. In the lower part of the stripper, however, a catalyst is loaded, but neither tray nor packing for gas-liquid contact is used. In the case where stripping is carried out without using trays or packing for gas-liquid contact, a sufficient gas-liquid contact area cannot be achieved, and therefore the stripping efficiency is low. Hence, it is difficult to reduce the concentration of ammonia in the wastewater at the outlet of the lower part of the condensate stripper.

An object of the present invention is to provide a method for treating an aqueous urea solution containing small amounts of urea, ammonia and carbon dioxide, for example, for treating process condensate which is condensed water that is separated and condensed from a concentration step in a urea production plant, the method being capable of reducing the residual urea concentration to 1 ppm or lower, decreasing the residual ammonia concentration, increasing LHSV, and minimizing an increase in the size of the apparatus.

Another object of the present invention is to provide an apparatus for treating an aqueous urea solution, in which the apparatus can be suitably used for this treating method.

An aspect of the present invention provides a method for treating an aqueous urea solution, the method including:

a first stripping step of stripping an aqueous solution containing urea, ammonia and carbon dioxide with steam at a pressure of 0.2 to 0.6 MPaA in a first stripper to separate ammonia and carbon dioxide from this aqueous solution into a gas phase and to obtain a stripped solution;

a hydrolysis step of hydrolyzing urea in the solution obtained from the first stripping step at an LHSV of 10 to 20 $h^{-1}$, at a pressure of 1.1 to 3.1 MPaA and at a temperature of 180 to 230° C. in a catalytic hydrolyzer which is a hydrolyzer including a catalyst; and a second stripping step of stripping a liquid obtained from the hydrolysis step with steam in a second stripper to separate ammonia and carbon dioxide from this liquid into a gas phase.

In the above method, it is preferable that the catalytic hydrolyzer has a first catalyst bed, a second catalyst bed, and a flow passage for directing liquid discharged from the first catalyst bed to the second catalyst bed, and the hydrolysis step includes:

(1) bringing the solution obtained from the first stripping step into countercurrent contact with steam, while this solution flows downward, in the first catalyst bed to hydrolyze urea and to separate ammonia and carbon dioxide generated by the hydrolysis into a gas phase, and withdrawing this gas phase from the catalytic hydrolyzer;

(2) feeding a solution, containing residual urea, obtained from step (1) to the second catalyst bed through the flow passage; and (3) bringing the fed solution into countercurrent contact with steam, while this solution flows downward, in the second catalyst bed to hydrolyze urea that still remains and to separate ammonia and carbon dioxide generated by the hydrolysis into a gas phase, and withdrawing this gas phase from the catalytic hydrolyzer.

In the above method, it is preferable that one or both of the first catalyst bed and the second catalyst bed include one or more catalysts selected from the group consisting of Ti, V, Fe, Zr, Mo, W, Pt, Ce, Al, Si and oxides thereof.

Another aspect of the present invention provides an apparatus for treating an aqueous urea solution, the apparatus including:

a first stripper configured to strip an aqueous solution containing urea, ammonia and carbon dioxide with steam, to separate ammonia and carbon dioxide from this aqueous solution into a gas phase and to obtain a stripped solution;

a catalytic hydrolyzer, which is a hydrolyzer including a catalyst bed, configured to hydrolyze urea in the solution obtained from the first stripper; and a second stripper configured to strip a liquid obtained from the catalytic hydrolyzer with steam to separate ammonia and carbon dioxide from this liquid into a gas phase, wherein the catalytic hydrolyzer includes:

a first catalyst bed;

a second catalyst bed;

a solution inlet, located above the first catalyst bed, for feeding the solution obtained from the first stripper to the first catalyst bed;

a first steam inlet, located below the first catalyst bed, for feeding steam to the first catalyst bed;

a gas phase outlet for withdrawing a gas phase from the catalytic hydrolyzer, this gas phase being discharged upward from the first catalyst bed and containing ammonia and carbon dioxide generated by the hydrolysis;

a flow passage for feeding a solution to the second catalyst bed from above the second catalyst bed, this solution being discharged downward from the first catalyst bed and containing residual urea;

a gas phase outlet for withdrawing a gas phase from the catalytic hydrolyzer, this gas phase being discharged upward from the second catalyst bed and containing ammonia and carbon dioxide generated by the hydrolysis;

a second steam inlet, located below the second catalyst bed, for feeding steam to the second catalyst bed; and a liquid outlet for withdrawing a liquid from the catalytic hydrolyzer, this liquid being discharged downward from the second catalyst bed.

In the above apparatus, it is preferable that one or both of the first catalyst bed and the second catalyst bed contain one or more catalysts selected from the group consisting of Ti, V, Fe, Zr, Mo, W, Pt, Ce, Al, Si and oxides thereof.

According to the present invention, there is provided a method for treating an aqueous urea solution containing small amounts of urea, ammonia and carbon dioxide, for example, for treating process condensate which is condensed water that is separated and condensed from a concentration step in a urea production plant, the method being capable of reducing the residual urea concentration to 1 ppm or lower, decreasing the residual ammonia concentration, increasing LHSV, and minimizing an increase in apparatus size.

Further, according to the present invention, there is provided an apparatus for treating an aqueous urea solution, in which the apparatus can be suitably used for this treating method.

DETAILED DESCRIPTION OF THE PREFERRED EMBODIMENTS

Figure 1:
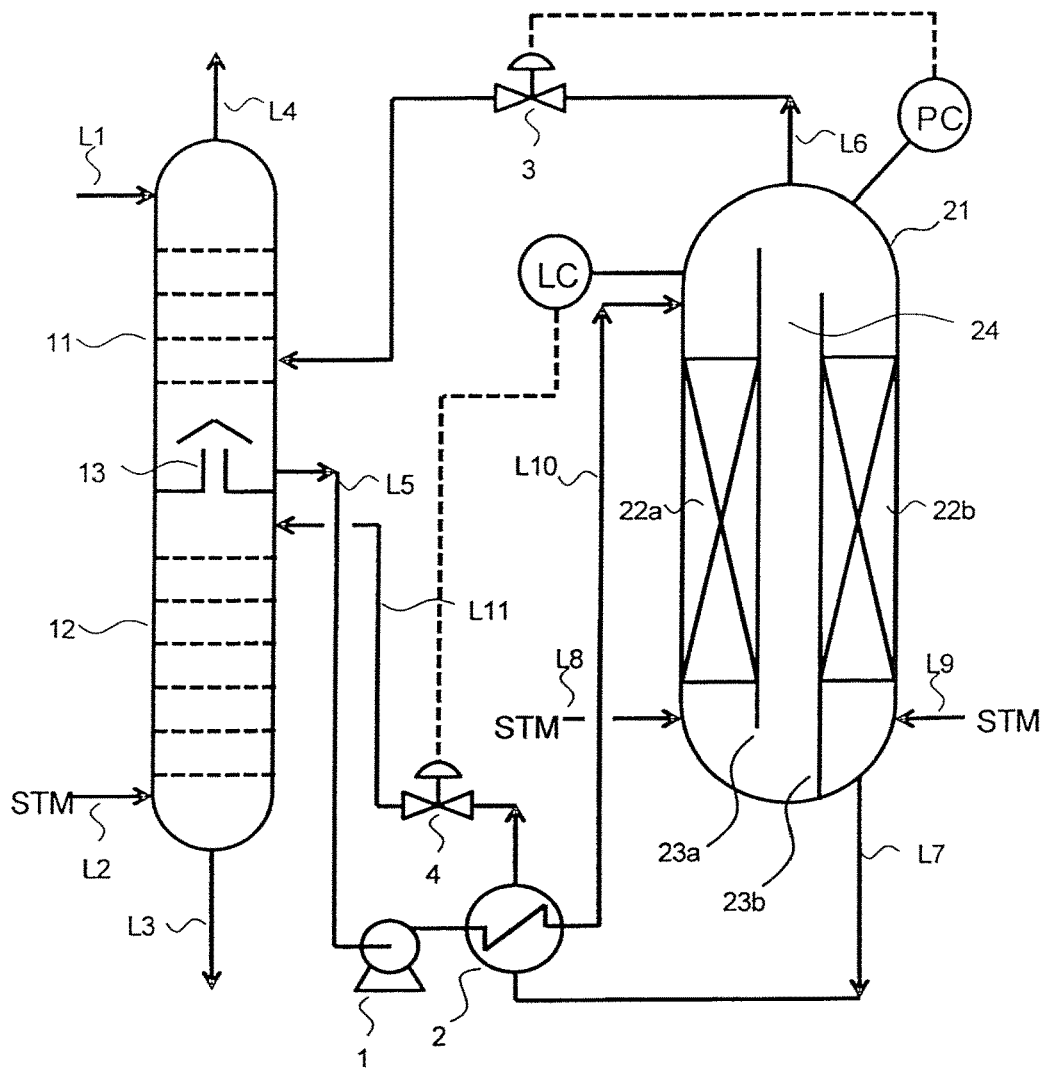
FIG. 1 is a schematic diagram illustrating an embodiment of an apparatus suitable for carrying out the present invention.

Hereinafter, embodiments according to the present invention will be described by reference to the drawings, but the present invention is not limited thereto. In the present specification, "A" in the pressure unit "MPaA" indicates absolute pressure. Further in the drawings, "STM" denotes steam; "PC", a pressure-sensing and controlling unit; and "LC", a liquid level-sensing and controlling unit.

In an apparatus for treating an aqueous urea solution illustrated in FIG. 1, first stripper 11 and second stripper 12 are integrated. That is, the interior of one vertical pressure vessel is partitioned into two regions, an upper and a lower region, by chimney tray 13. One (upper) region is utilized as the first stripper, and the other (lower) region is utilized as the second stripper. In the interior of each region, that is, in the interiors of the first and second strippers, there are provided trays (perforated plates illustrated in broken lines in the figure) for gas-liquid contact. In the interior of the each region, there may be disposed packing for gas-liquid contact in place of the trays, or together with the trays. A catalyst is not packed in any of the first and second strippers.

A gas which has risen from second stripper 12 passes through chimney tray 13 and is introduced to first stripper 11, and serves as a stripping agent. A liquid obtained in the first stripper accumulates in a liquid sump of the chimney tray, and is withdrawn from the liquid sump to the outside of the stripper (line L5).

However, the first and second strippers do not need to be integrated as described above, and separate strippers which are composed of respective separate pressure vessels may be used. In this case, overhead gas of the second stripper may be introduced to the column bottom of the first stripper, or the overhead gas of the second stripper may be discharged to the outside of the apparatus, and steam may separately be fed to the column bottom of the first stripper.

In the present invention, for hydrolysis of urea, a hydrolyzer containing a catalyst (referred to as a catalytic hydrolyzer) is used. Typically, the catalytic hydrolyzer is a reactor which contains, in the interior thereof, a catalyst bed packed with a catalyst that enhances the hydrolytic reaction. Catalytic hydrolyzer 21 illustrated in FIG. 1 has two catalyst beds, that is, first catalyst bed 22a and second catalyst bed 22b.

Figure 2:
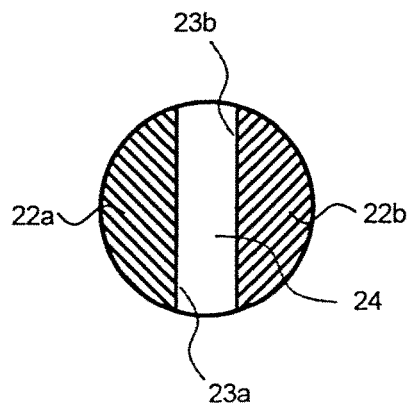
FIG. 2 is a schematic view illustrating a horizontal cross-section of a catalytic hydrolyzer included in the apparatus of FIG. 1.

FIG. 2 illustrates a horizontal cross-section of a midsection (portion where the first and second catalyst beds are present) of the catalytic hydrolyzer illustrated in FIG. 1. The basic structure of the catalytic hydrolyzer is obtained by partitioning the interior of one pressure vessel in the vertical (perpendicular) direction into three regions by way of partition plates 23a and 23b (both are in the shape of a planar plate) which are arranged in the vertical direction. Here, neither the upper end nor the lower end of partition plate 23a reaches the pressure vessel. The upper end of partition plate 23b does not reach the pressure vessel, but the lower end thereof reaches the pressure vessel. The pressure vessel is in the shape of a vertical cylinder so that, in the catalyst bed, a liquid easily flows downward while carbon dioxide and ammonia which are generated by the hydrolysis of urea, as well as steam, easily flow upward.

Amongst the abovementioned three regions, the leftmost region (referred to as "first catalyst bed-containing region") on the face of the drawing contains first catalyst bed 22a; the middle region (referred to as "empty region") does not contain any catalyst and is typically empty; and the rightmost region (referred to as "second catalyst bed-containing region") contains second catalyst bed 22b. In the top of the pressure vessel, these three regions communicate with each other. In the bottom of the pressure vessel, the first catalyst bed-containing region and the empty region communicate with each other. However, in the bottom of the pressure vessel, the second catalyst bed-containing region does not communicate with the other two regions.

The upper end of second partition plate 23b is located lower than the upper end of first partition plate 23a.

Figure 3:
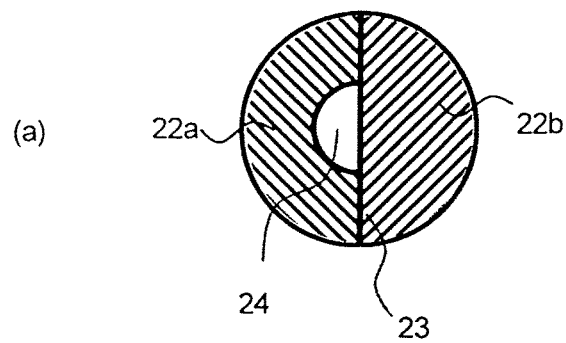
FIG. 3 is schematic views, in which each of (a), (b) and (c) illustrates another example of a horizontal cross-section of a catalytic hydrolyzer.
Figure 3:
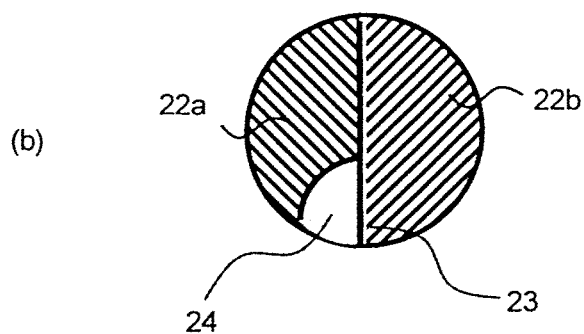
Figure 3:
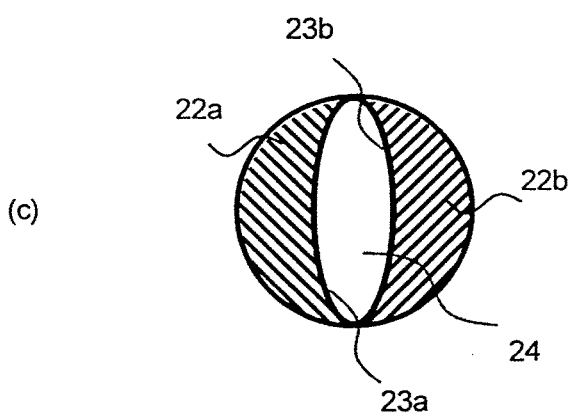

With regard to catalytic hydrolyzer 21 illustrated in FIG. 1, the first catalyst bed and the second catalyst bed are partitioned by the flow passage (a portion of flow passage, the portion being present in the empty region) in a single pressure vessel (in the shape of vertical cylinder). This configuration is illustrated straightforwardly in FIG. 2. At a level (height) where the catalyst beds of the catalytic hydrolyzer are present, the empty region is present between the first catalyst bed and the second catalyst bed; and liquid flows in downflow direction in the first and second catalyst beds, but liquid flows in upflow direction in the empty region. The empty region section may have a shape in which the section is partitioned by planar plates between the first catalyst bed section and the second catalyst bed section, as illustrated in FIG. 2. However, in addition, as illustrated in each of (a) to (c) of FIG. 3, the empty region section may be created by forming an empty space at a part of the boundary between the first and second catalyst bed sections. In this case, the top of the partition plate between the second catalyst bed and the empty region is located lower than the top of the partition plate between the first catalyst bed and the empty region so that liquid overflows only to the second catalyst bed section. In the example illustrated in FIG. 3(a), an empty region section whose cross-section is semicircular is formed between the first catalyst bed and the second catalyst bed by partition plate 23 which has a planar plate portion and a portion whose cross-section is semicircular. In the example illustrated in FIG. 3(b), an empty region section is formed between the first catalyst bed and the second catalyst bed by partition plate 23 which has a planar plate portion and a portion whose cross-section is arc (¼ circle)-shaped. In the example illustrated in FIG. 3(c), an empty region section whose cross-section is elliptic is formed between the first catalyst bed and the second catalyst bed by two partition plates 23a and 23b.

A solution inlet (connection port of line L10 to the catalytic hydrolyzer) for feeding a solution obtained from the first stripper to the first catalyst bed is provided above the first catalyst bed.

A first steam inlet (connection port of line L8 to the catalytic hydrolyzer) for feeding steam to the first catalyst bed is provided below the first catalyst bed.

A gas phase that contains ammonia and carbon dioxide which are generated by the hydrolysis of urea is discharged upward from the first catalyst bed. A gas phase outlet (connection port of line L6 to the catalytic hydrolyzer) for withdrawing the gas phase from the catalytic hydrolyzer is provided at the top of the catalytic hydrolyzer.

A solution which contains residual urea and which is discharged downward from the first catalyst bed can be fed to the second catalyst bed from above the second catalyst bed through flow passage 24. In FIG. 1, flow passage 24 is composed of the following portions: a portion of the first catalyst bed-containing region, this portion being located below the lower end of first catalyst bed 22a; the empty region; and a portion of the second catalyst bed-containing region, this portion being located above the upper end of second catalyst bed 22b. The solution which has been discharged downward from first catalyst bed 22a rises in the empty region of flow passage 24, and spills over and overflows the upper end of partition plate 23b, and is fed to second catalyst bed 22b.

That is, although the first and second catalyst beds are arranged in the horizontal direction at about the same height, since the upper end of partition plate 23b is positioned lower than the upper end of partition plate 23a, the solution which rose in the interior of flow passage 24 does not spill over the upper end of partition plate 23a, but spills over and overflows the upper end of partition plate 23b to be sent to the upper end of the second catalyst bed. The liquid which is discharged from the lower end of the first catalyst bed can thus be sent to the upper end of the second catalyst bed.

A second steam inlet (connection port of line L9 to the catalytic hydrolyzer) for feeding steam to the second catalyst bed is located below the second catalyst bed.

A gas phase containing ammonia and carbon dioxide which are generated by the hydrolysis is discharged upward from the second catalyst bed. A gas phase outlet (connection port of line L6 to the catalytic hydrolyzer) for withdrawing the gas phase from the catalytic hydrolyzer is provided at the top of the catalytic hydrolyzer. In the apparatus illustrated in FIG. 1, since the three regions are communicated with each other at the top as described above, the gas discharged from the first catalyst bed and the gas discharged from the second catalyst bed can be combined and withdrawn from a single outlet (connection port of line L6 to the catalytic hydrolyzer).

However, the invention is not limited to the abovementioned configuration. For example, the upper end of partition plate 23a may reach the pressure vessel of the catalytic hydrolyzer. That is, amongst the above-mentioned three regions, the first catalyst bed-containing region may not be communicated with the other two regions at the top of the catalytic hydrolyzer. In this case, an outlet for the gas which has been discharged from the first catalyst bed and an outlet for the gas which has been discharged from the second catalyst bed may be separately provided on the pressure vessel.

A liquid which has completed hydrolysis in the catalytic hydrolyzer is discharged downward from the second catalyst bed. This liquid is withdrawn from the catalytic hydrolyzer through a liquid outlet (connection port of line L7 to the catalytic hydrolyzer) provided at the bottom of the catalytic hydrolyzer.

Ammonia and carbon dioxide which are generated by the hydrolysis of urea inhibit the hydrolytic reaction. By carrying out hydrolysis of urea in two stages by using the first and second catalyst beds, and by removing (to line L6) ammonia and carbon dioxide in the middle of the hydrolysis, the hydrolysis of urea can be efficiently carried out. Hence, according to such means, it is easy to reduce the final urea concentration to 1 ppm or lower without significantly increasing the apparatus size (volume) as compared with a case where a single catalyst bed is used and ammonia and carbon dioxide are not removed in the middle of the hydrolysis.

[Liquid to be Treated]

Process condensate (condensed water) which is separated and condensed in a concentration step of a urea production process contains urea in an amount of typically 2% by mass or less, for example, 0.3 to 1.5% by mass. Typically, the ammonia concentration is 0.5 to 5.0% by mass, and the carbon dioxide concentration is 0.3 to 3.0% by mass. The present invention is suitable for treating such an aqueous solution.

[First Stripping Step]

The abovementioned aqueous solution is pressurized to 0.2 to 0.6 MPaA, and heated typically at 30 to 160° C., for example, at about 130° C., and introduced to first stripper 11, in particular to the top thereof, through line L1. In the first stripper, the aqueous solution is stripped with steam. Thereby, ammonia and carbon dioxide are separated from the aqueous solution to the gas phase.

Here, the overhead gas of the second stripper is used as stripping steam, where the overhead gas rises through chimney tray 13. However, the invention is not limited thereto. Separate steam may be fed to the bottom of the first stripper. In addition, the gas which has been discharged upward from the first and second catalyst beds passes through line L6 and is appropriately depressurized by pressure-reducing valve 3, and thereafter introduced to the first stripper. This gas is steam which contains ammonia and carbon dioxide, and is utilized as a stripping gas in the first stripper.

An aqueous urea solution from which ammonia and carbon dioxide have been separated is withdrawn from the bottom of the first stripper, in particular from the liquid sump of the chimney tray, to line L5.

The overhead gas of the first stripper contains steam and separated ammonia and carbon dioxide, and is discharged from line L4 to the outside of the apparatus. Typically, the temperature of the overhead gas is 120 to 160° C., and the pressure thereof is 0.2 to 0.6 MPaA, and the ammonia concentration is 5 to 30% by mass, and the carbon dioxide concentration is 5 to 30% by mass.

[Hydrolysis Step]

In a hydrolysis step, in catalytic hydrolyzer 21, urea in the urea aqueous solution obtained from the first stripping step is hydrolyzed at an LHSV of 10 to 20 h$^{-1}$, at a pressure of 1.1 to 3.1 MPaA and at a temperature of 180 to 230° C. Therefore, the aqueous urea solution which is discharged to line L5 is pressurized by pump 1, heated by heat exchanger 2, and fed to the catalytic hydrolyzer.

Here, in the case where the hydrolysis step is carried out by using the first and second catalyst beds which are provided in series, the LHSV used herein is the ratio of the feed rate (volume flow rate at 20° C.) of a liquid which is fed to the first catalyst bed to the sum of volumes of all the catalysts contained in the first and second catalyst beds.

In the hydrolysis step, steps 1 to 3 may be carried out.

<Step 1>

In step 1, in the first catalyst bed, the solution obtained from the first stripping step is brought into countercurrent contact with steam, while this solution flows downward, to hydrolyze urea. Simultaneously, ammonia and carbon dioxide generated by the hydrolysis are separated into a gas phase, and the gas phase is withdrawn from the catalytic hydrolyzer.

Specifically, the solution (line L5) which is obtained from the first stripping step is pressurized by pump 1, heated by heat exchanger 2, and fed from line L10 to catalytic hydrolyzer 21 (in particular to the top thereof). The feed position is above first catalyst bed 22a, and the fed solution descends and passes through the first catalyst bed. In addition, it is preferable that the feed position of the solution from line L10 be lower than the upper end of first partition plate 23a. Thereby, it is easy to prevent this solution from spilling over the upper end of first partition plate 23a and flowing out to flow passage 24. On the other hand, steam (line L8) is blown from below the first catalyst bed into the bottom of catalytic hydrolyzer 21, and rises in the first catalyst bed. By arranging the lower end of first partition plate 23a at a lower position than the steam feed position, it is easy to feed steam to the first catalyst bed with no waste.

The solution (downflow) from line L10 and steam (upflow) thus come into contact with each other in countercurrent flow. In the first catalyst bed, the hydrolytic reaction of urea is promoted. Ammonia and carbon dioxide which are generated by the hydrolysis are vaporized by steam and move into the steam phase, are directed upward from the first catalyst bed, and rise to the top of the catalytic hydrolyzer. The gas (containing ammonia and carbon dioxide) that has reached the top of the catalytic hydrolyzer is withdrawn through line L6 which is connected to the top. The temperature of the gas in line L6 is 180 to 230° C., and the pressure thereof is 1.1 to 3.1 MPaA.

The concentration of urea that remains in the liquid (liquid discharged downward from first catalyst bed 22a) from which ammonia and carbon dioxide have thus been separated, that is, the urea concentration of the liquid obtained from step 1, can be 50 to 500 ppm. It is preferable that ammonia and carbon dioxide which are generated in the first catalyst bed be separated into the gas phase and that the concentration of residual urea in the liquid which is discharged from the first catalyst bed be made within the abovementioned range, because this makes it easy for the hydrolysis of urea in the second catalyst bed to proceed so that the urea concentration becomes 1 ppm or lower. When the concentration of residual urea in the liquid obtained from step 1 is 500 ppm or lower, the urea decomposition efficiency in the second catalyst bed can be enhanced. In addition, it is easy to obtain a liquid which has a residual urea concentration of 50 ppm or higher in step 1. Further, it is preferable that the concentration of urea in the liquid obtained from step 1 be within the range of from 50 to 100 ppm or lower.

<Step 2>

In step 2, the aqueous solution which contains residual urea and which is obtained in step 1 is fed to the second catalyst bed through flow passage 24.

The solution which is discharged downward from the first catalyst bed goes under the lower end of partition plate 23a, rises and passes through the space between partition plates 23a and 23b, spills over the upper end of partition plate 23b and overflows into second catalyst bed 22b.

<Step 3>

In step 3, in the second catalyst bed, the fed solution comes into countercurrent contact with steam, while this solution flows downward, to further hydrolyze the urea. Simultaneously, ammonia and carbon dioxide generated by the hydrolysis are separated into a gas phase, and the gas phase is withdrawn from the catalytic hydrolyzer.

Into the second catalyst bed, steam is blown from line L9 which is positioned below the second catalyst bed. As steam, there can be used steam which is similar to the steam blown from line L8 into the first catalyst bed. In the second catalyst bed, the aqueous urea solution descends while steam rises. Therefore, the aqueous urea solution and steam come into countercurrent contact with each other. The hydrolytic reaction is promoted in the second catalyst bed. Most of the ammonia and carbon dioxide which are generated by this hydrolysis are transferred to the top of the catalytic hydrolyzer by the blown steam, and withdrawn to line L6 together with the above-mentioned ammonia and carbon dioxide which were separated in step 1 and the accompanying steam.

A liquid from which ammonia and carbon dioxide have been separated is withdrawn from below the second catalyst bed (from the bottom of the catalytic hydrolyzer) to line L7. The concentration of residual urea in this liquid can be reduced to 1 ppm or lower.

The gas stream which is discharged to line L6 is appropriately depressurized by pressure-reducing valve 3, and thereafter returned to first stripper 11. Here, a pressure sensor is provided to the top of the catalytic hydrolyzer, and the pressure can be adjusted by pressure-reducing valve 3.

The liquid which is discharged to line L7 is cooled by heat exchanger 2, appropriately depressurized by pressure-reducing valve 4, and introduced to second stripper 12, in particular, to the top thereof.

Here, in the top of the catalytic hydrolyzer, preferably in a portion (in the first catalyst-containing region) above first catalyst bed 22a, a liquid level sensor is provided, and the liquid level can be adjusted by pressure-reducing valve 4.

[Second Stripping Step]

In the liquid in line L7, there remain very small amounts of ammonia and carbon dioxide. The liquid which is fed from line L7 via pressure-reducing valve 4 and line L11 is subjected to final steam stripping in second stripper 12. Steam is introduced from line L2 to the second stripper, in particular, to the bottom thereof.

Ammonia and carbon dioxide remaining in the liquid are separated into a gas phase in second stripper 12, and sent together with steam from the top of the second stripper to the bottom of the first stripper. A treated liquid is discharged from the bottom of the second stripper through line L3. The concentration of urea in the liquid thus obtained can be reduced to 1 ppm or lower; and the ammonia concentration therein, 1 ppm or lower.

By carrying out steps 1 to 3, ammonia and carbon dioxide can be removed in the middle of the urea hydrolysis step, and inhibition of the hydrolytic reaction of urea can be reduced. Therefore, it becomes easy to reduce the urea concentration.

In addition, in steps 1 and 3, since the liquids are allowed to flow in downflow direction, the fluidization of the catalysts can be prevented.

Further, since the two-stage hydrolysis (steps 1 and 3) is carried out in a single apparatus, the operation can be prevented from becoming complicated due to an increase in the number of process operation parameters, and an increase in the number of devices and the resulting increase in costs can also be avoided.

[Another Constitution Example of the Catalytic Hydrolyzer]

Figure 4:
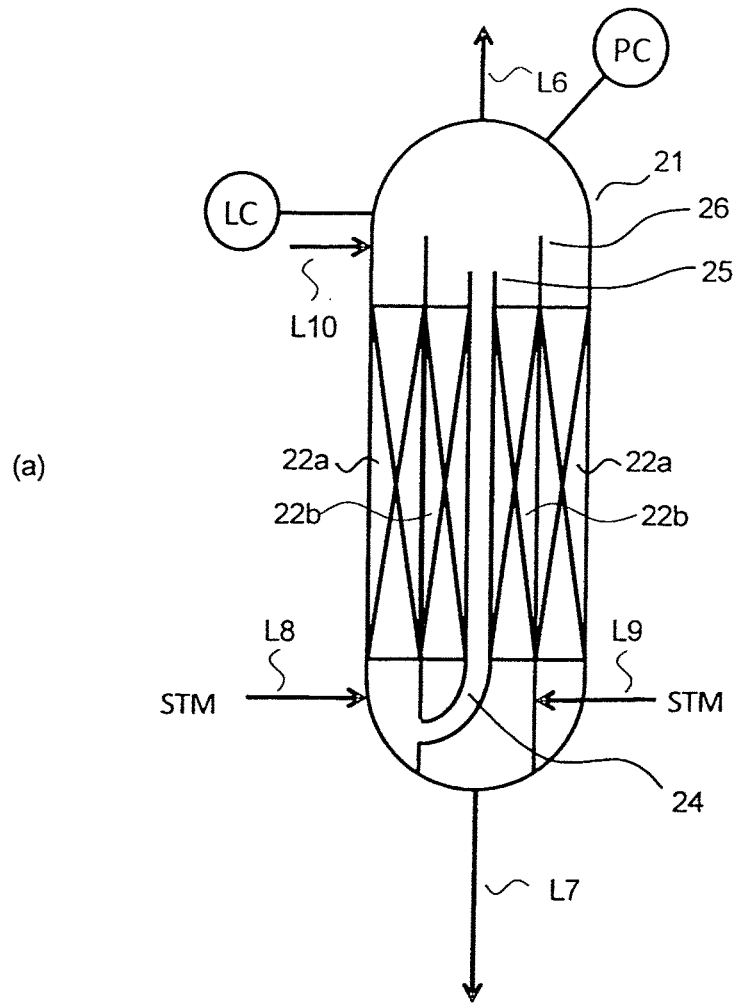
FIG. 4 is a schematic diagram illustrating another example of a catalytic hydrolyzer, in which (a) illustrates its vertical cross-section and (b) illustrates its horizontal cross-section.
Figure 4:
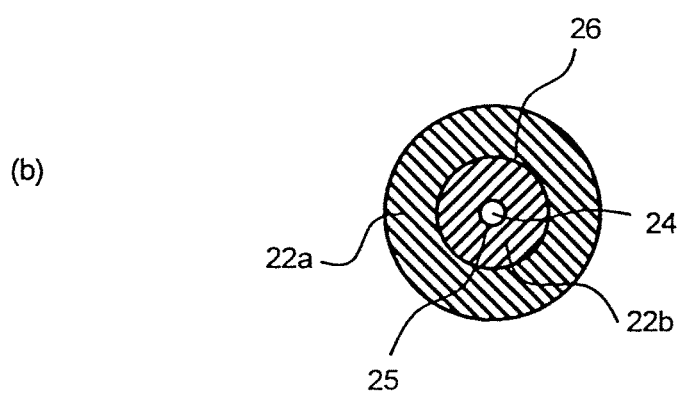

In a catalytic hydrolyzer illustrated in FIG. 4, by using vertical cylindrical partitioning member 26 which includes inner tube 25, and by partitioning the interior of a single pressure vessel (in the shape of vertical cylinder) into the inside and outside of partitioning member 26, a first catalyst bed-containing region and a second catalyst bed-containing region are formed. The upper end of the vertical cylindrical partitioning member 26 is positioned higher than the upper end of inner tube 25, but does not reach the pressure vessel. The lower end of vertical cylindrical partitioning member 26 reaches the pressure vessel. Inner tube 25 is a tubular member arranged vertically, and extends from the bottom (below first catalyst bed 22a) of the first catalyst bed-containing region toward the top of the pressure vessel, but does not reach the pressure vessel. The lower end of the inner tube penetrates the vertical cylindrical partitioning member and is opened toward the first catalyst bed-containing region. It is preferable that this opening be positioned below a steam inlet (connection port of line L8). Also in this structure, the first catalyst bed-containing region, an empty region and the second catalyst bed-containing region communicate with each other in the top of the pressure vessel. In the bottom of the pressure vessel, the first catalyst bed-containing region and the empty region communicate with each other, but the second catalyst bed-containing region does not communicate with the other two regions. As illustrated in FIG. 4(b), each of the first and second catalyst beds 22a and 22b has an annular cross-section.

In FIG. 4, flow passage 24 is composed of the following portions: a portion of the first catalyst bed-containing region, this portion being positioned below the lower end of first catalyst bed 22a; the empty region; and a portion of the second catalyst bed-containing region, this portion being above the upper end of second catalyst bed 22b.

The liquid obtained from the first stripper is fed from line L10 to above first catalyst bed 22a. Steam is fed from line L8 to below the first catalyst bed. A liquid discharged from the lower end of first catalyst bed 22a enters flow passage 24 from the opening on the lower end of inner tube 25, and spills over the upper (open) end of the inner tube and overflows to second catalyst bed 22b. The liquid descends the annular region (accommodating catalyst bed 22b) between inner tube 25 and vertical cylindrical partitioning member 26, and is withdrawn from the bottom (below the second catalyst bed) of the annular region to line L7. Further, to the second catalyst bed, steam is fed from line L9 which is located below the second catalyst bed. Respective gas phases rising from the first catalyst bed and the second catalyst bed are withdrawn from the top of the catalytic hydrolyzer to line L6.

The catalytic hydrolyzer illustrated in FIG. 4, similarly to the catalytic hydrolyzer illustrated in FIG. 1, can be used in combination with the first and second strippers.

[Catalyst]

According to the present invention, the hydrolyzer is packed with a catalyst to promote the hydrolytic reaction of urea. In the case where the first and second catalyst beds are used, each of the first and second catalyst beds is packed in the catalytic hydrolyzer.

It is preferable that the catalyst includes one or more selected from the group consisting of Ti, V, Fe, Zr, Mo, W, Pt, Ce, Al, Si and oxides thereof.

According to the present invention, by applying catalysts to the hydrolytic reaction of urea which is contained in a process condensate, and by operating the hydrolyzer under a high-temperature and high-pressure condition of 180 to 230° C. and 1.1 to 3.1 MPaA, the hydrolysis rate of urea is increased. Thereby, it is possible to operate the hydrolyzer at a relatively high LHSV, and to downsize the hydrolyzer.

EXAMPLES

Hereinafter, the present invention will be described in more detail based on Examples, but the present invention is not limited thereto.

Example 1

With respect to an aqueous urea solution treating apparatus having a constitution illustrated in FIG. 1, a heat and material balance was calculated, and LHSV in a catalytic hydrolyzer was calculated. A treated object was an aqueous solution containing urea, ammonia and carbon dioxide, which was typical of a process condensate that was separated and condensed in a urea concentration step.

A process condensate composed of 748 kg/h of urea, 1,376 kg/h of ammonia, 890 kg/h of carbon dioxide and 62,530 kg/h of water was fed from line L1 to the top of first stripper 11, and came into countercurrent contact with steam, accompanied by ammonia and carbon dioxide, which was rising in the interior of first stripper 11. Ammonia and carbon dioxide which had been contained in the process condensate were separated as a gas from the top (line L4). As stripping steam, an overhead gas of second stripper 12 was introduced into the bottom of the first stripper. Further, a gas discharged from the top of catalytic hydrolyzer 21 was fed from line L6 to the first stripper, and was also used as stripping steam.

The process condensate having reached the liquid sump of chimney tray 13 was withdrawn from line L5, pressurized by pump 1, pre-heated by heat exchanger 2, and introduced from line L10 to the top of catalytic hydrolyzer 21. In the interior of the catalytic hydrolyzer, two regions accommodating first and second catalyst beds 22a and 22b were formed by partition plates 23a and 23b, respectively; support plates to hold catalysts were provided below the respective regions; and $Al_2O_3$-based catalysts were packed on the support plates. The total volume of the catalysts packed in the two catalyst beds corresponded to an LHSV of 10 $h^{-1}$. In the bottom of the catalytic hydrolyzer, steam (2.7 MPaA, 3,791 kg/h) was blown from line L8 to the first catalyst bed; and the process condensate descended in countercurrent contact with steam and reached the bottom. As a result of the steam blowing, the temperature of the liquid in the bottom reached 210 to 220° C. Thereby, urea was hydrolyzed to 80 ppm (concentration of urea in the liquid discharged from the lower end of the first catalyst bed) in first catalyst bed 22a; and a part of thus generated ammonia and carbon dioxide rose together with steam in catalyst bed 22a and reached the top of the catalytic hydrolyzer, and was separated as a gas at the top (line L6).

The liquid from which ammonia and carbon dioxide had thus been separated passed through flow passage 24 in the pressure vessel interior, was introduced to second catalyst bed 22b, descended in countercurrent contact with steam (2.7 MPaA, 489 kg/h) which was blown from below the second catalyst bed in the bottom of the catalytic hydrolyzer, and reached the bottom. Thereby, urea was further hydrolyzed; and in the bottom, its concentration was reduced to 1 ppm (concentration of urea in a liquid discharged from the lower end of the second catalyst bed). On the other hand, ammonia and carbon dioxide which were generated in the second catalyst bed were transferred to the top of the catalytic hydrolyzer by steam, and withdrawn from the catalytic hydrolyzer together with ammonia and carbon dioxide which were separated in the first catalyst bed (line L6). The pressure of the top of the catalytic hydrolyzer was maintained at 2.4 MPaA by pressure-reducing valve 3 which was installed on line L6. The gas in line 6 went through pressure-reducing valve 3 and the pressure of the gas became the operating pressure of the stripper. The gas was fed to first stripper 11, and was finally withdrawn (line L4) from the top of the first stripper together with ammonia and carbon dioxide separated in the first stripper.

The liquid which was withdrawn (line L7) from the bottom of catalytic hydrolyzer 21 contained ammonia (0.86% by mass) and carbon dioxide (0.21% by mass). The liquid was cooled by heat exchanger 2, thereafter depressurized by pressure-reducing valve 4, and fed to the top of second stripper 12 accommodating multistage perforated plates (trays). In the second stripper, while the liquid descended, slightly remaining ammonia and carbon dioxide were vaporized by steam which was blown from line L2 into the bottom. The vaporized ammonia and carbon dioxide were finally discharged from line L4 via the first stripper. In such a manner, water which was practically free of urea, ammonia and carbon dioxide (the urea concentration was 1 ppm or lower, and the ammonia concentration was 1 ppm or lower) was discharged as a wastewater from the bottom of the second stripper through line L3.

The process conditions are summarized in Table 1.

Comparative Example 1

The heat and material balances were calculated in the cases where a hydrolyzer having no catalyst bed, described in JP H06-91987B, was used in place of the catalytic hydrolyzer, under the same conditions of the flow rates, temperatures and pressures as in Example 1, and the volume of the portion where a liquid and steam contacted with each other was varied. As a result, it was found that in order to obtain water which was practically free of urea, ammonia and carbon dioxide (the urea concentration was 1 ppm or lower, and the ammonia concentration was 1 ppm or lower) from the bottom of the second stripper through line L3, the volume of the portion where the liquid and steam came into contact with each other was required to correspond to an LHSV of 1 $h^{-1}$. The results are summarized in Table 1.

TABLE 1

|    |    |    |    | Example 1 | Comparative Example 1 |
|---|---|---|---|---|---|
| L1 | Process Condensate (Feed Aqueous Urea Solution) | Urea Flow Rate | kg/h | 748 | 748 |
|    |    | NH3 Flow Rate | kg/h | 1376 | 1376 |
|    |    | CO2 Flow Rate | kg/h | 890 | 890 |
|    |    | H2O Flow Rate | kg/h | 62530 | 62530 |
|    |    | Total Flow Rate | kg/h | 65544 | 65544 |

TABLE 1-continued

|  |  |  |  | Example 1 | Comparative Example 1 |
|---|---|---|---|---|---|
| L4 | First Stripper Overhead Gas | Pressure | MPaA | 0.4 | 0.4 |
| L6 | Catalytic Hydrolyzer Overhead Gas | NH3 Flow Rate | kg/h | 77 | 77 |
|  |  | CO2 Flow Rate | kg/h | 419 | 419 |
|  |  | H2O Flow Rate | kg/h | 1436 | 1436 |
| L8 | Steam for First Catalyst Bed | Pressure | MPaA | 2.7 | 2.7 |
|  |  | Flow Rate | kg/h | 3791 | 3791 |
| L9 | Steam for Second Catalyst Bed | Pressure | MPaA | 2.7 | 2.7 |
|  |  | Flow Rate | kg/h | 489 | 489 |
| L7 | Catalytic Hydrolyzer Bottom Liquid | Urea Concentration | ppm | 1 | 1 |
| L3 | Second Stripper Bottom Liquid (Treated Water) | Urea Concentration | ppm | ≤1 | ≤1 |
|  |  | NH3 Concentration | ppm | ≤1 | ≤1 |
| 22a, b | First and Second Catalyst Beds | LHSV | $h^{-1}$ | 10 | 1 |

In Example 1 and Comparative Example 1, the heat and material balances were the same; and in each example, wastewater having a urea concentration of 1 ppm or lower and an ammonia concentration of 1 ppm or lower was obtained. However, LHSV in the catalytic hydrolyzer of Comparative Example 1 was 1 $h^{-1}$; by contrast, that of Example 1 was 10 $h^{-1}$. Therefore, with respect to the apparatus size (total volume of the first and second catalyst beds or of the corresponding parts thereof) of the catalytic hydrolyzer, the size in Example 1 was smaller than that in Comparative Example 1.

EXPLANATION OF LETTERS OR NUMERALS

1 Pump
2 Heat Exchanger
3 Pressure-Reducing Valve
4 Pressure-Reducing Valve
11 First Stripper
12 Second Stripper
13 Chimney Tray
21 Catalytic Hydrolyzer
22a First Catalyst Bed
22b Second Catalyst Bed
23 Partition Plate
23a First Partition Plate
23b Second Partition Plate
24 Flow Passage
25 Inner Tube
26 Vertical Cylindrical Partitioning Member

What is claimed is:

1. A method for treating an aqueous urea solution, comprising:
   a first stripping step of stripping an aqueous solution containing urea, ammonia and carbon dioxide with steam at a pressure of 0.2 to 0.6 MPaA in a first stripper to separate ammonia and carbon dioxide from this aqueous solution into a gas phase and to obtain a stripped solution;
   a hydrolysis step of hydrolyzing urea in the solution obtained from the first stripping step at an LHSV of 10 to 20 $h^{-1}$, at a pressure of 1.1 to 3.1 MPaA and at a temperature of 180 to 230° C. in a catalytic hydrolyzer which is a hydrolyzer containing a catalyst; and
   a second stripping step of stripping a liquid obtained from the hydrolysis step with steam in a second stripper to separate ammonia and carbon dioxide from this liquid into a gas phase,
   wherein the catalytic hydrolyzer has a first catalyst bed, a second catalyst bed, and a flow passage for directing a liquid discharged from the first catalyst bed to the second catalyst bed,
   wherein the hydrolysis step comprises:
   (1) bringing the solution obtained from the first stripping step into countercurrent contact with steam, while this solution flows downward, in the first catalyst bed to hydrolyze urea and to separate ammonia and carbon dioxide generated by the hydrolysis into a gas phase, and withdrawing this gas phase from the catalytic hydrolyzer;
   (2) feeding a solution, containing residual urea, obtained from step (1) to the second catalyst bed through the flow passage; and
   (3) bringing the fed solution into countercurrent contact with steam, while this solution flows downward, in the second catalyst bed to hydrolyze urea which still remains and to separate ammonia and carbon dioxide generated by the hydrolysis into a gas phase, and withdrawing this gas phase from the catalytic hydrolyzer, and
   wherein each of the first and second stripper comprises at least one selected from the group consisting of a tray and packing for gas-liquid contact.

2. An apparatus for treating an aqueous urea solution, comprising:
   a first stripper configured to strip an aqueous solution containing urea, ammonia and carbon dioxide with steam, to separate ammonia and carbon dioxide from this aqueous solution into a gas phase and to obtain a stripped solution;
   a catalytic hydrolyzer, which is a hydrolyzer containing a catalyst bed, configured to hydrolyze urea in the solution obtained from the first stripper; and
   a second stripper configured to strip a liquid obtained from the catalytic hydrolyzer with steam to separate ammonia and carbon dioxide from this liquid into a gas phase,
   wherein the catalytic hydrolyzer comprises:
   a first catalyst bed;
   a second catalyst bed;
   a solution inlet, located above the first catalyst bed, for feeding the solution obtained from the first stripper to the first catalyst bed;
   a first steam inlet, located below the first catalyst bed, for feeding steam to the first catalyst bed;

a gas phase outlet for withdrawing a gas phase from the catalytic hydrolyzer, this gas phase being discharged upward from the first catalyst bed and containing ammonia and carbon dioxide generated by the hydrolysis;

a flow passage for feeding a solution to the second catalyst bed from above the second catalyst bed, this solution being discharged downward from the first catalyst bed and containing residual urea;

a gas phase outlet for withdrawing a gas phase from the catalytic hydrolyzer, this gas phase being discharged upward from the second catalyst bed and containing ammonia and carbon dioxide generated by the hydrolysis;

a second steam inlet, located below the second catalyst bed, for feeding steam to the second catalyst bed; and a liquid outlet for withdrawing a liquid from the catalytic hydrolyzer, this liquid being discharged downward from the second catalyst bed, wherein each of the first and second stripper comprises at least one selected from a tray and packing for gas-liquid contact.

3. The apparatus according to claim 2, wherein one or both of the first catalyst bed and the second catalyst bed contain one or more catalysts selected from the group consisting of Ti, V, Fe, Zr, Mo, W, Pt, Ce, Al, Si and oxides thereof.

4. The method according to claim 1, wherein one or both of the first catalyst bed and the second catalyst bed comprise one or more catalysts selected from the group consisting of Ti, V, Fe, Zr, Mo, W, Pt, Ce, Al, Si and oxides thereof.

5. The method according to claim 1, wherein the catalytic hydrolyzer has a structure in which an interior of a pressure vessel is communicatively partitioned in a vertical direction into three regions, and wherein, amongst the three regions, one region contains the first catalyst bed, another region contains the second catalyst bed, and the other region is the flow passage.

6. The apparatus according to claim 2, wherein the catalytic hydrolyzer has a structure in which an interior of a pressure vessel is communicatively partitioned in a vertical direction into three regions, and wherein, amongst the three regions, one region contains the first catalyst bed, another region contains the second catalyst bed, and the other region is the flow passage.

* * * * *